US009852298B2

(12) United States Patent
Jeansonne et al.

(10) Patent No.: US 9,852,298 B2
(45) Date of Patent: Dec. 26, 2017

(54) CONFIGURING A SYSTEM

(71) Applicant: HEWLETT-PACKARD DEVELOPMENT COMPANY, L.P., Houston, TX (US)

(72) Inventors: Jeffrey Kevin Jeansonne, Houston, TX (US); Marat Nersisyan, Palo Alto, CA (US); Achyutram Bhamidipaty, Palo Alto, CA (US); Jayne E Scott, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 14/780,989

(22) PCT Filed: Apr. 23, 2013

(86) PCT No.: PCT/US2013/037727
§ 371 (c)(1),
(2) Date: Sep. 28, 2015

(87) PCT Pub. No.: WO2014/175863
PCT Pub. Date: Oct. 30, 2014

(65) Prior Publication Data
US 2016/0055338 A1 Feb. 25, 2016

(51) Int. Cl.
*G06F 9/00* (2006.01)
*G06F 9/24* (2006.01)
(Continued)

(52) U.S. Cl.
CPC .......... *G06F 21/575* (2013.01); *G06F 3/0623* (2013.01); *G06F 3/0632* (2013.01);
(Continued)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS 5,269,022 A * 12/1993 Shinjo .................. G06F 9/4406
713/100
5,432,927 A * 7/1995 Grote .................... G06F 9/4403
711/103
(Continued)

FOREIGN PATENT DOCUMENTS

CN 1534685 A 10/2004
CN 100472657 3/2009
(Continued)

OTHER PUBLICATIONS

European Patent Office, extended European Search Report for Appl. No. 13882792.8 dated Sep. 20, 2016 (8 pages).
(Continued)

*Primary Examiner* — Zahid Choudhury
(74) *Attorney, Agent, or Firm* — Trop, Pruner & Hu, P.C.

(57) ABSTRACT

In response to starting a system including a first non-volatile memory containing system boot code, and a second non-volatile memory, provisioning of the second non-volatile memory is performed. The provisioning includes checking that the second non-volatile memory is uninitialized, and in response to determining that the second non-volatile memory is uninitialized, the system boot code is copied from the first non-volatile memory to the second non-volatile memory.

20 Claims, 4 Drawing Sheets

(51) Int. Cl.
*G06F 15/177* (2006.01)
*G06F 21/57* (2013.01)
*G06F 3/06* (2006.01)
*G06F 21/56* (2013.01)
*H04L 29/06* (2006.01)
*G06F 11/14* (2006.01)
*G06F 11/20* (2006.01)

(52) U.S. Cl.
CPC ............ *G06F 3/0688* (2013.01); *G06F 21/56* (2013.01); *H04L 63/14* (2013.01); *G06F 11/1417* (2013.01); *G06F 11/2094* (2013.01); *G06F 2221/033* (2013.01)

(58) Field of Classification Search
CPC ............ G06F 9/44514; G06F 9/44523; G06F 11/1417; G06F 9/44505
See application file for complete search history.

(56) References Cited

U.S. PATENT DOCUMENTS

| | | | |
|---|---|---|---|
| 5,822,581 A * | 10/1998 | Christeson | G06F 15/7814 712/E9.007 |
| 6,665,813 B1 | 12/2003 | Forsman et al. | |
| 7,136,994 B2 * | 11/2006 | Zimmer | G06F 11/1441 713/1 |
| 7,890,726 B1 | 2/2011 | Falik et al. | |
| 7,908,470 B1 | 3/2011 | Cavanna | |
| 8,132,253 B2 | 3/2012 | Martinez et al. | |
| 8,316,200 B2 | 11/2012 | Matsuoka et al. | |
| 2002/0078338 A1 * | 6/2002 | Lay | G06F 9/4418 713/2 |
| 2004/0068334 A1 | 4/2004 | Tsai et al. | |
| 2004/0153846 A1 | 8/2004 | Lee | |
| 2008/0086629 A1 | 4/2008 | Dellow | |
| 2009/0049293 A1 | 2/2009 | Jiang | |
| 2009/0150598 A1 | 6/2009 | Jung et al. | |
| 2009/0172639 A1 * | 7/2009 | Natu | G06F 21/57 717/120 |
| 2009/0240934 A1 | 9/2009 | Chou | |
| 2012/0239920 A1 * | 9/2012 | Yang | G06F 8/65 713/2 |
| 2012/0297178 A1 | 11/2012 | Peng et al. | |
| 2014/0325203 A1 * | 10/2014 | Roche | G06F 11/1417 713/2 |

FOREIGN PATENT DOCUMENTS

| | | |
|---|---|---|
| KR | 20090060774 | 6/2009 |
| TW | 200941344 A | 10/2009 |
| TW | 201020785 A | 6/2010 |

OTHER PUBLICATIONS

Hodge et al., International Application No. PCT/US13/37725 entitled Redundant System Boot Code in a Secondary Non-Volatile Memory filed Apr. 23, 2013 (25 Pages).

Jeansonne et al., International Application No. PCT/US13/37724 entitled Recovering From Compromised System Boot Code filed Apr. 23, 2013 (29 Pages).

Jeansonne et al., International Application No. PCT/US13/37728 entitled Event Data Structure to Store Event Data filed Apr. 23, 2013 (36 pages).

Jeansonne et al., International Application No. PCT/US13/37733 entitled Retrieving System Boot Code From a Non-Volatile Memory filed Apr. 23, 2013 (26 pages).

Jeansonne et al., International Application No. PCT/US13/37735 entitled Verifying Controller Code and System Boot Code filed Apr. 23, 2013 (36 pages).

Yin, et al; "Verification-based Multi-backup Firmware Architecture, an Assurance of Trusted Boot Process for the Embedded Systems", <http://ieeexplore.ieee.org/stamp/stamp.jsp?arnumber=6120953 > On pp. 1188-1195, Nov. 16-18, 2011.

* cited by examiner

CONFIGURING A SYSTEM

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some embodiments are described with respect to the following figures.

DETAILED DESCRIPTION

Figure 1:
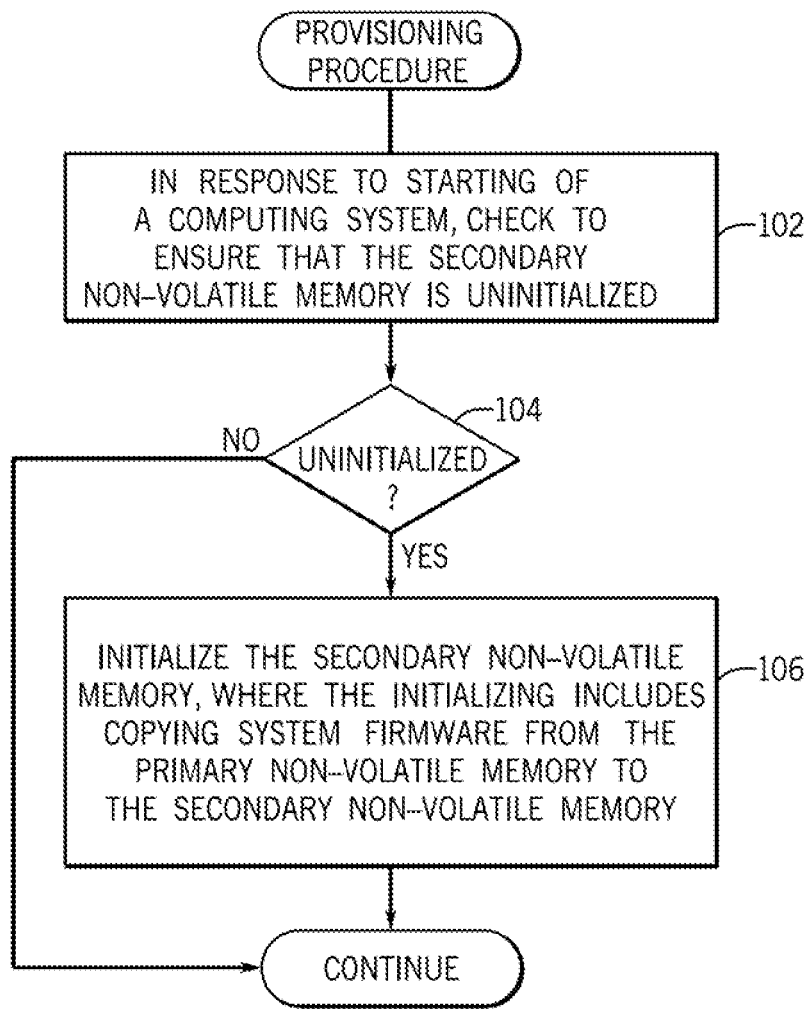
FIG. 1 is a flow diagram of a provisioning procedure according to some implementations.

Malware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or intentionally.

Although a protection mechanism can be provided in a computing system to protect the system code, such protection mechanism may become compromised under certain conditions, which can subject the system code to malware attacks.

System code used to perform startup of a computing system can include system firmware, which can be in the form of machine-readable instructions executable on a processor (or processors) of the computing system. "System firmware" can cover any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

In the present discussion, although reference is made to "system firmware," it is noted that techniques or mechanisms can be applied to other types of system boot code, where system boot code can refer to any code that can boot a computing system after restart the computing system or can resume the computing system from a low power state.

A computing system can also include an embedded controller, separate from the processor(s) of the computing system, for performing various designated tasks. Controller code in the form of embedded controller (EC) firmware can be executed on the embedded controller for performing the designated tasks. The EC firmware is in the form of machine-readable instructions. Although protection mechanisms are provided to protect the EC firmware from compromise, it is also possible in some cases for the EC firmware to become compromised.

In the ensuing discussion, reference is made to EC firmware that can be executed in an embedded controller. In other examples, techniques or mechanisms according to some implementations can be applied to other types of controller code executable in an embedded controller or other type of controller.

Also, in the ensuing discussion, it is assumed that the EC firmware is part of the system firmware. In other implementations, the EC firmware can be separate from the system firmware.

To protect system firmware from being compromised, either due to a malware attack or unintentional compromise, a secondary non-volatile memory can be provided in addition to a primary non-volatile memory that is used to store the system firmware. The secondary non-volatile memory can be used to store a copy of the system firmware. The system firmware copy on the secondary non-volatile memory can be a duplicate of the system firmware in the primary non-volatile memory. Alternatively, the system firmware copy in the secondary non-volatile memory may be different version (later version or earlier version) than the system firmware in the primary non-volatile memory.

Providing multiple non-volatile memories each storing respective copies of system firmware can add to manufacturing overhead of a computing system that includes the multiple non-volatile memories. In some cases, during a manufacturing process for a computing system, the primary non-volatile memory may be pre-programmed with the system firmware, along with associated system data, prior to installation of the primary non-volatile memory in the computing system. If the secondary non-volatile memory would also have to be subjected to the same pre-programming process, then an extra step would be added to the manufacturing process, which can increase manufacturing costs associated with the computing system.

In accordance with some implementations, rather than pre-program the secondary non-volatile memory prior to installation of the secondary non-volatile memory in the computing system, the secondary non-volatile memory can be installed as a blank part (which does not contain a system firmware copy) in the computing system. For example, the secondary non-volatile memory can be mounted on a circuit board of the computing system without first programming the secondary non-volatile memory. The mounting of the secondary non-volatile memory can be accomplished by soldering the secondary non-volatile memory to the circuit board, or by some other attachment technique.

On first power up of the circuit board that includes the secondary non-volatile memory, along with an embedded controller that is connected to the secondary non-volatile memory, a provisioning procedure can be performed to program the secondary non-volatile memory. First power up of the circuit board can refer to the first time that the circuit board is powered up during manufacture. More generally, the provisioning procedure can be performed in response to starting of a computing system. Starting the computing system can refer to booting the computing system in response to power up, system reset, etc., or otherwise initializing the computing system from an off state.

As shown in FIG. 1, a provisioning procedure can be performed by the embedded controller in some implementations, and more specifically, by controller code executable by the embedded controller. The embedded controller code can be loaded from the primary non-volatile memory, where the loading can be performed by an initial loader that can check the validity of the controller code before executing the controller code.

In response to starting of the computing system, the provisioning process checks (at 102) to ensure that the secondary non-volatile memory is uninitialized. The secondary non-volatile memory may be uninitialized if (1) the secondary non-volatile memory has not previously been programmed, or (2) the secondary non-volatile memory was previously initialized but subsequently has been erased.

The embedded controller can determine that the secondary non-volatile memory has not been initialized in one of several different ways. For example, the secondary non-volatile memory can include a specified region, and a hash, checksum, or other value can be computed based on the content in the specified region. In some examples, the specified region is a policy store for storing policy information (discussed further below). In alternative examples, the specified region can be another region in the secondary non-volatile memory. If the secondary non-volatile memory had been previously programmed, then this specified region would include valid content and a stored hash, checksum, or other value. If the computed hash, checksum, or other value matches the stored hash, checksum, or other value, then that is an indication to the embedded controller that the secondary non-volatile memory has been previously stored. On the other hand, if there is no match, then that is an indication that the secondary non-volatile memory is uninitialized.

Alternatively, or additionally, the checking (at 102) includes looking for a signature (e.g. a specified known value or a marker) at a specified location in the secondary non-volatile memory. If the signature is present in the specified location, then that is an indication that the secondary non-volatile memory has been initialized. However, if the signature is not present in the specified location, then that is an indication that the secondary non-volatile memory is uninitialized.

In response to determining (at 104) that the secondary non-volatile memory is uninitialized, the embedded controller initializes (at 106) the secondary non-volatile memory, where the initializing includes copying system firmware (as well as controller code of the embedded controller) from the primary non-volatile memory to the secondary non-volatile memory. However, if the embedded controller determines (at 104) that the secondary non-volatile memory is initialized, then task 106 is bypassed.

Note, that the embedded controller can copy system firmware from the primary non-volatile memory to secondary non-volatile memory under other conditions, such as when the embedded controller detects that the versions of the system firmware in the primary and secondary non-volatile memories are different.

As part of the initializing at 106, the provisioning procedure can also write a signature to a specified location in the secondary non-volatile memory to indicate that the secondary non-volatile memory has been initialized. In some examples, the writing of the signature can be a last step of the initializing at 106.

In addition, the provisioning procedure can create the policy store that stores policy information in the secondary non-volatile memory, as well as initialize an audit data structure (e.g. audit log). The policy information can pertain to policies relating to execution of the EC firmware. For example, at least one of the policies can relate to repairing of system firmware upon detecting that the system firmware has been compromised. Another example policy can specify whether an aggressive mode of operation is to be used, where aggressive mode enables verification of system firmware (to check whether the system firmware has been compromised) in every case where the processor will execute a boot block of the system firmware. Another example policy specifies whether a manual or automated recovery mode is to be used, where a manual recovery mode involves a user action before recovery of a compromised system firmware is allowed to be performed. A further example policy specifies whether a locked or unlocked mode is to be used, where locked mode causes system firmware to be locked to a specific version, such as the version in the secondary non-volatile memory.

In some implementations, the provisioning procedure can initialize the policy information to default values.

The audit log can store records relating to events of the EC firmware. The initialization of the audit log prepares the audit log to accept information relating to events of the EC firmware.

The provisioning procedure of FIG. 1 can be performed during the manufacturing process of the computing system, such as at a factory. The provisioning procedure can be performed after a circuit board including the secondary non-volatile memory is first inserted into the computing system, where the secondary non-volatile memory at this stage is blank. By performing the provisioning procedure during the manufacturing process, it can be assured that the computing system is in a safe environment such that provisioning of the content of the secondary non-volatile memory can be performed in a secure manner.

Figure 2:
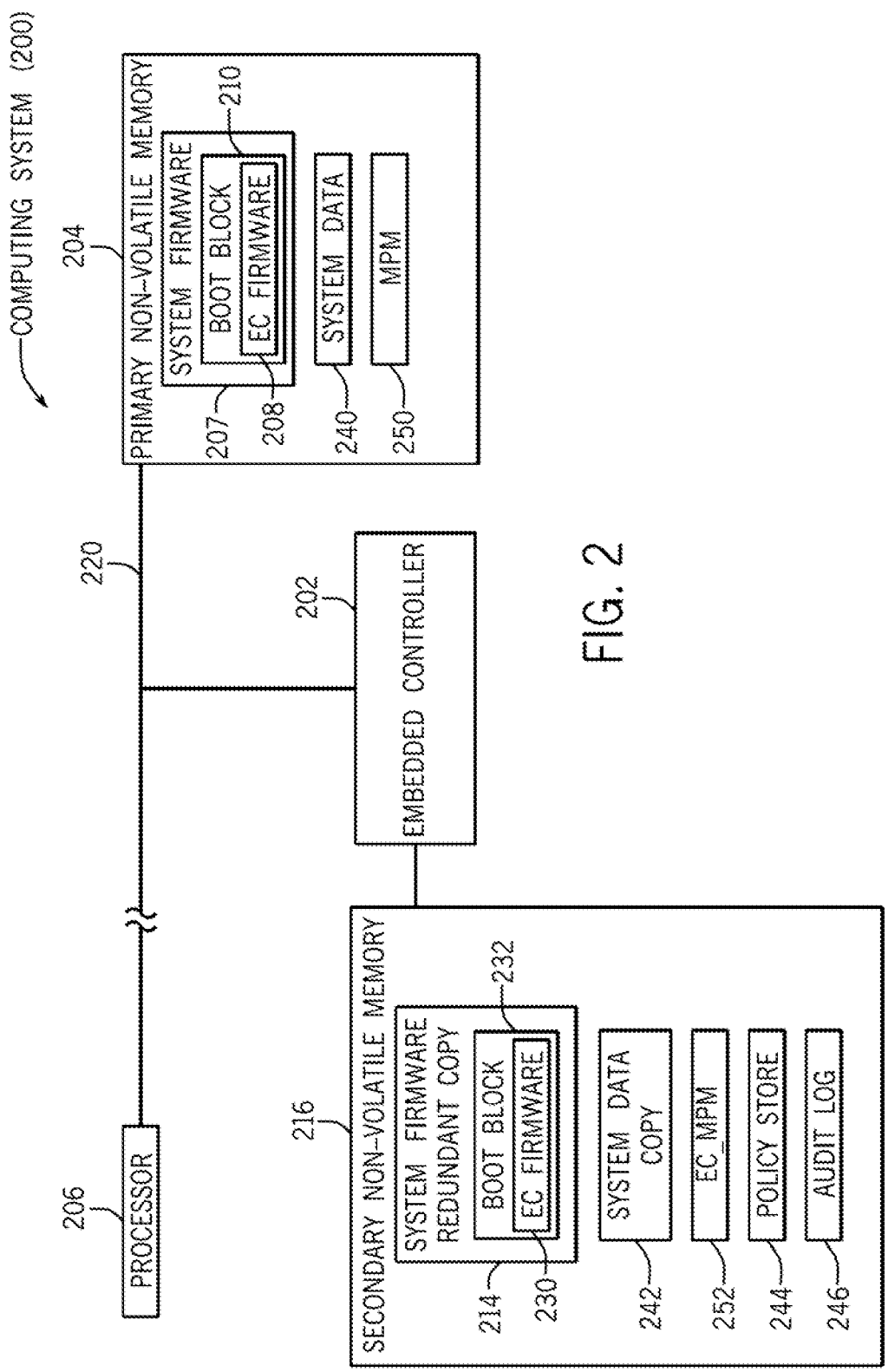
FIG. 2 is a block diagram of an example computing system that incorporates some implementations.

FIG. 2 is a block diagram of an example computing system 200 that includes an embedded controller 202, a primary non-volatile memory 204, a processor 206, and a secondary non-volatile memory 216. The primary non-volatile memory 204 is a shared non-volatile memory that it is accessible by multiple entities, including the embedded controller 202 and at least one other entity (including the processor 206). The secondary non-volatile memory 216 is accessible by the embedded controller 202, but is inaccessible to the processor 206 or to other components in the computing system 200 (effectively, the secondary non-volatile memory 216 is electrically isolated from entities other than the embedded controller 202). Making the secondary non-volatile memory 216 inaccessible to the processor 206 and other components protects the content of the secondary non-volatile memory 216 from unauthorized tampering. The secondary non-volatile memory 216 can be accessible by the embedded controller 202 at all times.

Although not shown in FIG. 1, an input/output (I/O) controller may be provided between the processor 206 and the primary non-volatile memory 204.

The secondary non-volatile memory 216 can be physically separate from the primary non-volatile memory 204 (such as implemented in different physical memory devices). Alternatively, the secondary non-volatile memory 216 and the primary non-volatile memory 204 can physically reside on a common memory device, but the primary non-volatile memory 204 and the secondary non-volatile memory 216 are in different segments of the physical memory device, where the segment of the physical memory device that contains the secondary non-volatile memory 216 is accessible by only the embedded controller 202. In other words, the segment that contains the secondary non-volatile memory 216 is under exclusive control of the embedded controller 202, and this segment is locked from access by the processor 206 or another entity.

The primary non-volatile memory 204 is accessible over a shared bus 220 by the embedded controller 202 or by another entity. In some implementations, just one entity can have access to the shared bus 220 at any given time, such that just one entity can access the primary non-volatile memory 204 at a time. In some examples, the shared bus 220 is a shared Serial Peripheral Interface (SPI) bus. An SPI bus is a synchronous serial data link in which devices on the SPI bus operate in a master-slave mode. In other examples, another type of shared bus 220 can be used. In alternative examples, an arbitration mechanism can be provided to allow for shared access of the bus 220 in various states of the computing system, including a low power state and a normal runtime state.

The primary non-volatile memory 204 can store system firmware 207, which can include BIOS code. The BIOS code 207 can include EC firmware 208 that is for execution by the embedded controller 202, and a boot block 210 that is to be executed by the processor 206.

In examples according to FIG. 1, the EC firmware 208 is included in the boot block 210 of the system firmware 207. Including the EC firmware 208 inside the boot block 210 can provide an indication that the EC firmware 208 has been signed by the entity that provided the system firmware 207, which can be the vendor of the computing system 200, or another entity. In other examples, the EC firmware 208 can be separate from the boot block 210.

The boot block 210 is a part of the BIOS code, and is first executed when the computing system 200 starts up. The boot block 210 is executed first before the rest of the BIOS code is allowed to execute on the processor 206. The boot block 210 can be used to check the integrity of the BIOS code as well as to perform other initial functions. If the boot block 210 confirms the integrity of the BIOS code, then the boot block 210 can pass control to the main portion of the BIOS code for initiating the remaining operations associated with the BIOS code.

In some implementations, the boot block 210 can include core root of trust for measurement (CRTM) logic, which is logic specified by the Trusted Computing Group (TCG), an industry standard work group. During a power on procedure of the computing system 200, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 200 based on measurements taken by the CRTM logic.

The embedded controller 202 is physically separate from the processor 206 of the computing system 200. The processor 206 is used for executing the OS, application code, and other code in the system 200. The embedded controller 202, on the other hand, can be used to perform specific predefined tasks, as programmed into the EC firmware 208. Examples of tasks that can be performed by the embedded controller 202 include any one or some combination of the following: power supply control in the computing system 200 (for controlling a power supply that supplies power supply voltages to various components in the computing system 200), charging and control of a battery in the computing system 200, thermal monitoring (to monitor a temperature in the computing system 200), fan control (to control a fan in the computing system 200), and interaction with a user input device (such as performing a scan of a keyboard of the computing system 200 or interaction with a pointing device such as a mouse, touchpad, touchscreen, and so forth). The embedded controller 202 can be implemented with a microcontroller, an application-specific integrated circuit (ASIC), a programmable gate array (PGA), or any other type of programmable circuit.

The secondary non-volatile memory 216 stores a redundant copy 214 of system firmware, where the system firmware redundant copy 214 includes a boot block 232 and an EC firmware 230. The system firmware redundant copy 214 in the secondary non-volatile memory 216 can be a duplicate of the system firmware 207 in the primary non-volatile memory 204. Alternatively, the system firmware redundant copy 214 may be a different version (later version or earlier version) than the system firmware 207.

In some implementations, the system firmware redundant copy 214 includes just the boot block 232, but does not include the main portion of the BIOS code. In other implementations, the system firmware redundant copy 214 can include the entirety of the BIOS code. In further examples, the secondary non-volatile memory 216 may also store other code, such as operating system or application code, code of the processor 206, and so forth.

In some implementations, at some point during the manufacturing process or at a different time, the embedded controller 202 can receive commands from the system firmware 207 (executing on the processor 206) that trigger additional provisioning of the secondary non-volatile memory. For example, the commands from the system firmware 207 can instruct the embedded controller 202 to commit system data 240 from the primary non-volatile memory 204 to the secondary non-volatile memory 216, by copying the system data 240 to the secondary non-volatile memory 216, for storage as a system data copy 242. The system data 240 can include machine unique data, which can refer to any configuration data or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), a default setting of BIOS code, and so forth. The foregoing is provided as examples of machine unique data; in other examples, other or additional types of machine unique data can be provided.

In some examples, upon saving the system data copy 242 to the secondary non-volatile memory 216, the embedded controller 202 can calculate a hash, checksum, or other value based on the content of the system data 240. This hash, checksum, or other value can be saved to the secondary non-volatile memory 216 and associated with the system data copy 242.

The system firmware 207 can further provide other instructions that can cause the embedded controller 202 to read further system data from the primary non-volatile memory 204, and save such further system data to the secondary non-volatile memory 216.

Such further system data can include, as examples, configuration data of a network controller of the computing system 200. The network controller can be used to communicate over a network according to a network protocol, such as an Ethernet protocol (e.g. Gigabit Ethernet protocol or other type of Ethernet protocol), or another type of protocol. In examples where the network protocol supported by the network controller is the Gigabit Ethernet (GbE) protocol, then the configuration data of the network controller can include data in a GbE region of the primary non-volatile memory 204. The GbE region is a data structure containing programmable settings for the network controller that can be part of the computing system. The programmable settings are read by the network controller upon deassertion of a bus reset signal on a bus to which the network controller is connected.

In other examples, the further system data that can be copied from the primary non-volatile memory 204 to the secondary non-volatile memory 216 additionally includes a Descriptor region. The Descriptor region is a data structure containing information that describes a layout of the primary non-volatile memory 204, and configuration parameters for an input/output (I/O) controller, such as the Platform Controller Hub (PCH) from Intel Corporation, or another type of I/O controller. The PCH can include various functions, including a display interface to a graphics subsystem, a system bus interface to a system bus to which various I/O devices can be connected, and so forth. The I/O controller can read the data in the Descriptor region upon exit of the I/O controller from reset.

In other examples, additional or alternative system data can be copied from the primary non-volatile memory 204 to the secondary non-volatile memory 216.

By copying data from the GbE region and Descriptor region to the secondary non-volatile memory 216, a backup of the GbE region data and Descriptor region data is created.

As part of copying each of the GbE region data and the Descriptor region data to the secondary non-volatile memory 216, the embedded controller 202 can calculate a corresponding hash, checksum, or other value based on each of the GbE region data and Descriptor region data, respectively. These hash, checksum, or other values can be saved to the secondary non-volatile memory 216 in association with respective ones of the GbE region data copy and the Descriptor region data copy.

The hash, checksum, or other values associated with various pieces of system data in the secondary non-volatile memory can be used later to verify that the content of such system data has not changed, so that the integrity of the backup copy of the system data in the secondary non-volatile memory 216 can be verified.

The secondary non-volatile memory 216 further stores a policy store 244 to store policy information, and audit log 246 to store event data relating to events associated with the embedded controller 202.

After the secondary non-volatile memory 216 is configured (by performing the provisioning procedure of FIG. 1 and the copying of various system data to the secondary non-volatile memory 216), the embedded controller 202 can monitor the integrity of the content (code and data) stored in the secondary non-volatile memory to ensure that the content has not been compromised due to malware, a code bug, or other cause. The integrity check of the content in the secondary non-volatile memory 216 can be performed each time the embedded controller 202 comes out of reset, during a low power state of the computing system, or at any other time where the backup copies of the code and system data are to be retrieved for performing a recovery operation.

As noted above, there can be various types of backup system data in the secondary non-volatile memory 216, including some or all of the following: machine unique data, GbE region data, Descriptor region data, audit log data, and policy store data. In some examples, the machine unique data, GbE region data, and Descriptor region data are expected to remain static in the computing system 200 after provisioning of the secondary non-volatile memory 216, such as in the factory or by a service facility. If any of the foregoing pieces of system data in the secondary non-volatile memory 216 is to be used, such as to recover respective compromised system data in the primary non-volatile memory 204, then a process depicted in FIG. 3 can be performed.

Figure 3:
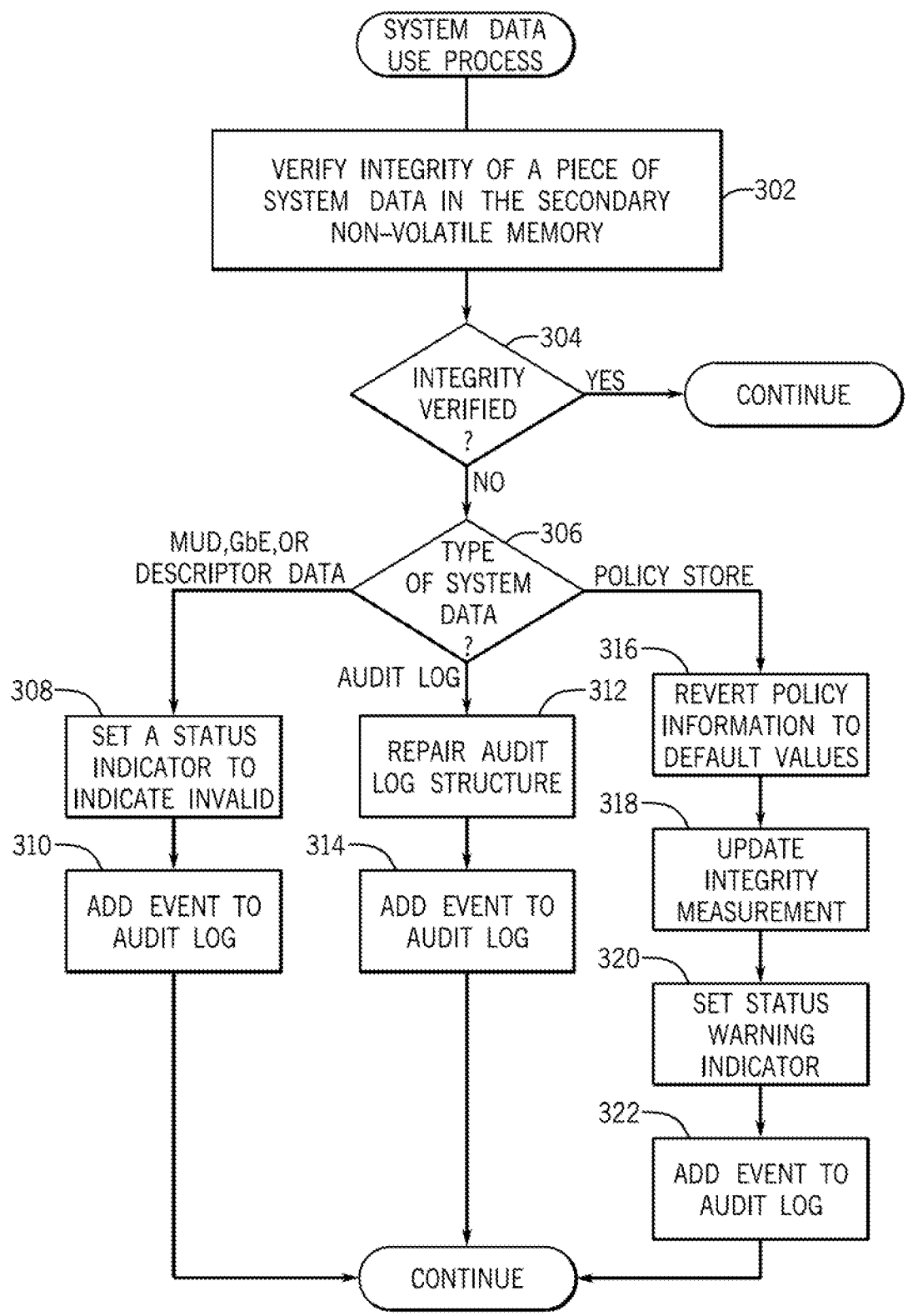
FIG. 3 is a flow diagram of a process of using system data according to some implementations.

In the process of FIG. 3, the embedded controller 202 can verify (at 302) the integrity of each of the pieces of system data in the secondary non-volatile memory 216 that is to be used.

To verify the integrity of each of the foregoing pieces of data stored in the secondary non-volatile memory 216, the embedded controller 202 can calculate a hash or other value with the respective piece of system data, and compare the calculated hash or other value to the stored hash or other value in the secondary non-volatile memory. A match indicates that the respective piece of system data is valid. A non-match indicates that the respective piece of system data has changed, which is an indication of the piece of system data being compromised.

The verification of the integrity of the audit log 246 can include verifying that the physical structure of the audit log is correct and ready to receive audit log events. To verify the integrity of policy information in the policy store, the embedded controller 202 can store a measurement of the policy store in the secondary non-volatile memory 216 each time the policy information is updated. The measurement may be in the form of a hash, checksum, or other value based on the policy information stored in the policy store. The embedded controller 202 can calculate the measurement and confirm that the measurement matches the policy store measurement value to verify the policy store integrity. If there is no match, that is an indication that the policy store 244 has been compromised.

The embedded controller 202 determines (at 304) whether the integrity of the piece of system data has been verified. If so, then the process of FIG. 3 ends. However, if the integrity of the piece of system data has not been verified, then further processing can depend on the type of the piece of system data (as determined at 306). In some implementations, it is assumed that the machine unique data, GbE region data, and Descriptor region data are to be captured in a secure environment such as at a factory or a service facility. Consequently, in some examples, these types of system data in the secondary non-volatile memory 216 are not recoverable in the field. Once a data integrity issue is encountered, the embedded controller 202 can set (at 308) a corresponding status indicator to indicate that the respective piece of system data is invalid. For example, each of the machine unique data, GbE region data, and Descriptor data can be associated with a respective status indicator that can be set to a first value to indicate that the respective system data is invalid. The corresponding status indicator if set to a second value indicates that the respective system data is valid.

Upon the status indicator for a respective piece of system data being set to the first value to indicate that the respective piece of system data is invalid, the embedded controller 202 will stop performing an integrity check of the respective piece of system data from the time that the status indicator was set to the first value. In addition, upon setting the status indicator to the first value, the embedded controller 202 can add (at 310) a respective event to the audit log to indicate that an error has occurred.

The status indicator when set to the first value informs the system firmware 207 that the copy of the respective piece of data (e.g. machine unique data, GbE region data, or Descriptor region data) in the secondary non-volatile memory 216 is not to be used for recovery of the respective piece of system data in the primary non-volatile memory 204. Accordingly, the respective feature corresponding to the invalid piece of system data can be disabled (or deprecated). For example, use of the machine unique data, GbE region data, and Descriptor data can be deprecated.

To correct the respective piece of system data associated with the status indicator indicating that the piece of system data is invalid, the computing system 200 can be placed into a manufacture programming mode to remedy the issue, as discussed further below. Note that the manufacture programming mode is a mode that can be entered into at a factory or at a service facility, and not in the field at a user site.

If the embedded controller 202 determines (at 306) that the audit log in the secondary non-volatile memory 216 is damaged in such a way that the embedded controller 202 would no longer be able to add new events to the audit log, the embedded controller 202 can repair (at 312) the structure of the audit log. Upon repairing the audit log structure, the embedded controller 202 can add (at 314) an event to the audit log indicating that a structural problem of the audit log was detected and repaired.

If the embedded controller 102 determines (at 306) that the data integrity issue is in the policy store in the secondary non-volatile memory 216, the embedded controller 202 can revert (at 316) the policy information (e.g. policy information that can be user-controlled) to default values and commit the default values back to the secondary non-volatile memory 216. In addition, the integrity measurement in the secondary non-volatile memory 216 relating to the policy store can be updated (at 318). Setting the policy information to default values can include setting a parameter EC_MPM (252 in FIG. 2) to a disabled state. The EC_MPM parameter 252 is a value stored in the secondary non-volatile memory 216 relating to the manufacture programming mode, and is discussed further below. In other examples, other parameters of the policy information can be set to default values.

Upon reverting the policy information to default states, the embedded controller 202 can set (at 320) a status warning indicator for the next boot cycle to indicate that the embedded controller policies have reverted to default values. A warning message can be displayed by the system firmware to a user, in response to the status warning indicator being set. In response to this display message, a user may reconfigure the settings in system firmware setup (e.g. BIOS setup) if different settings are desired. Additionally, an event can be added (at 322) to the audit log indicating that a data integrity issue has been detected in the policy store, and the policies have been reverted to default values.

As further depicted in FIG. 2, an MPM parameter 250 (relating to the manufacture programming mode) is stored in the primary non-volatile memory 204, and a copy of the MPM parameter is stored in the policy store in the secondary non-volatile memory 216, as the EC_MPM parameter 252. A default setting for the EC_MPM parameter is a disabled setting (which indicates that the manufacture programming mode is disabled). More generally, the MPM and EC_MPM parameters are indicators stored in the primary and secondary non-volatile memories for use in transitioning to various states associated with the manufacture programming mode.

A computing system can be placed in a manufacture programming mode at a factory or service facility. In the manufacture programming mode, service personnel can set or change system firmware content and system data in the primary non-volatile memory 204. For example, the system data (such as the machine unique data, GbE region data, and Descriptor region data) can be modified.

In some examples, the service personnel, using an application, can access certain system firmware settings using an interface, such as the Windows Management Instrumentation (WMI) interface, or other type of interface, when the computing system 200 is in the manufacture programming mode. The manufacture programming mode is available at a factory or at a service facility that is to perform repair or other servicing of computing systems. In the manufacture programming mode, various system data, such as the machine unique data, GbE region data, and Descriptor region data, can be cleared in the secondary non-volatile memory 216. This allows new backup copies of the machine unique data, GbE region data, and Descriptor region data to be copied from the primary non-volatile memory 204, which can be performed to fix compromised system data in the secondary non-volatile memory 216, for example.

Figure 4:
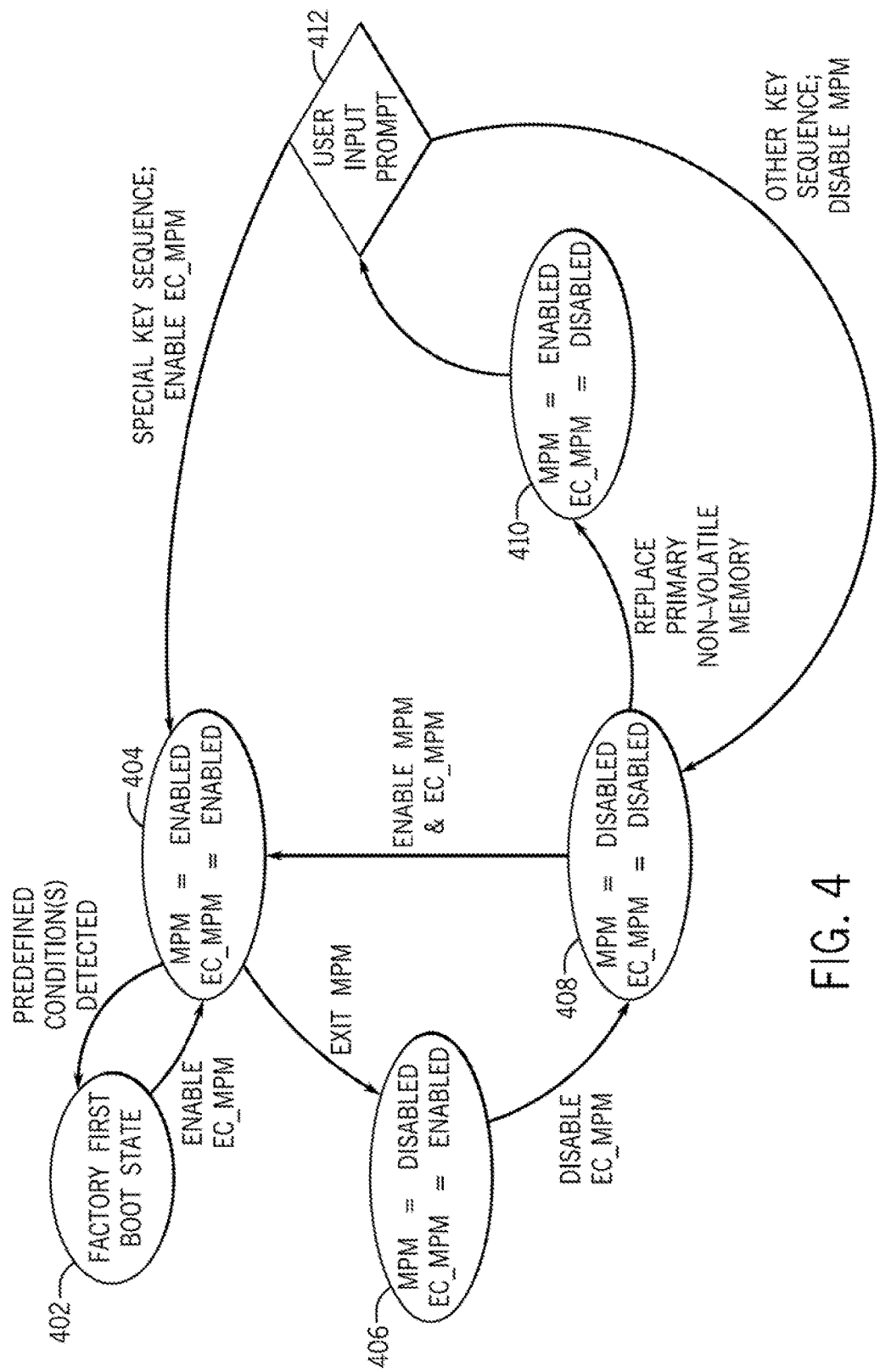
FIG. 4 is a state diagram of various states relating to a manufacture programming mode according to some implementations.

FIG. 4 is a state diagram illustrating various states of a state machine relating to the manufacture programming mode. A factory first boot state 402 represents a state at the factory when the computing system 200 is manufactured. The factory first boot state 402 can be the state of the computing system 200 the first time the computing system 200 is booted at the factory. The factory first boot state 402 is indicated based at least on the following: the MPM parameter 250 (FIG. 2) in the primary non-volatile memory 204 is in the enabled state, and the EC_MPM parameter 252 in the secondary non-volatile memory 216 is in the disabled state.

The default state MPM parameter 250 in the primary non-volatile memory 204 is set to the enabled state via external programming before the primary non-volatile memory 204 is attached to the circuit board of the computing system 200. During initialization of the secondary non-volatile memory 216 performed by the embedded controller 202, the EC_MPM parameter 252 in the secondary non-volatile memory 216 is provisioned to the disabled state, as part of the initialization procedure performed in FIG. 1, for example.

Moreover, in some implementations, the factory first boot state 402 is further indicated by the following indicators having false states: Valid MUD Captured, Valid GbE Captured, and Valid Descriptor Captured. These indicators being set to the false state indicates that copies of the machine unique data, GbE region data, and Descriptor region data, respectively, have not been made to the secondary non-volatile memory 216. The Valid MUD Captured indicator, Valid GbE Captured indicator, and Valid Descriptor Captured indicator can be set to true states once copies of the respective machine unique data, GbE region data, and Descriptor region data have been captured in the secondary non-volatile memory 216.

Upon first boot of the computing system 200 at the factory, the system firmware 207 can send a command to the embedded controller 202 to set the EC_MPM parameter 252 (in the secondary non-volatile memory 216) to the enabled state, to cause a transition from state 402 to state 404. State 404, represented by the MPM parameter 250 and the EC_MPM parameter 252 both being in the enabled state, corresponds to the manufacture programming mode of the computing system 200.

In the manufacture programming mode in state 404, service personnel can modify system data in the primary non-volatile memory 204 as desired. At some point, the system firmware 207 can exit the manufacture programming mode of state 404. The system firmware 207 triggers the exit from the manufacture programming mode by setting the MPM parameter 250 to the disabled state. This causes the MPM parameter 250 to be set at the disabled state, while the EC_MPM parameter 252 remains at the enabled state. The foregoing combination triggers a transition from state 404 to state 406.

Note that a transition can occur from state 404 back to the factory first boot state 402 if at least one predefined condition is detected. For example, the at least one predefined condition includes: (1) the secondary non-volatile memory 216 being erased using a predefined key sequence entered by a user; or (2) a detection of the policy store 244 being compromised.

In state 406, the system firmware 207 can send a command to the embedded controller 202 to copy machine unique data from the primary non-volatile memory 204 to the secondary non-volatile memory 216. In addition, the system firmware 207 can send a command to the embedded controller 202 to set the EC_MPM parameter 252 in the disabled state, which causes a transition from state 406 to state 408.

As part of the transition from state 406 to state 408, the system firmware 207 causes performance of a cold boot of the computing system 200. In addition, the embedded controller 202 asserts a reset signal (e.g. RSMRST#) to core logic (e.g. I/O controller such as Intel PCH) in the computing system 202 to ensure that the embedded controller 202 has access to the primary non-volatile memory 204. Also, in the transition from state 406 to state 408, the embedded controller 202 reads the GbE region data and Descriptor region data from the primary non-volatile memory 202 and creates a backup copy in the secondary non-volatile memory 216. In some examples, the embedded controller 202 can also update the copy of the boot block 232 in the secondary non-volatile memory 216 if the boot block 232 in the secondary non-volatile memory 216 is different from the boot block 210 in the primary non-volatile memory 204.

Note that state 408, corresponding to both the MPM parameter 250 and EC_MPM parameter 252 being in the disabled state, is the state of normal operation of the computing system 200 in the field by a user.

As part of the process of entering the state 408, the embedded controller 202 can perform the following: confirm status indicators that indicate that the boot block 232, machine unique data, GbE region data, and Descriptor region data are populated in the secondary non-volatile memory 216. Also, the embedded controller 202 can perform a comparison of hash, checksum, or other values as follows: confirm that a hash, checksum, or other value of the boot block 232 in the secondary non-volatile memory 216 matches the hash, checksum, or other value of a boot block 210 in the primary non-volatile memory; confirm that the hash, checksum, or other value of the machine unique data in the secondary non-volatile memory 216 matches the hash, checksum, or other value of the machine unique data in the primary non-volatile memory 204; confirm that the hash, checksum, or other value of the GbE region in the secondary non-volatile memory 216 matches the hash, checksum, or other value of the GbE region data in the primary non-volatile memory 204; and confirm that the hash, checksum, or other value of the Descriptor region data in the secondary non-volatile memory 216 matches the hash, checksum, or other value of the Descriptor region data in the primary non-volatile memory 202.

Subsequently, the computing system 200 may be returned to the factory or service facility for some reason, such as due to detection of the computing system 200 being compromised. At the factory or service facility, an application can be used by service personnel to issue a secure command to the system firmware 207 to change the state of the MPM parameter 250 and EC_MPM parameter 252 to the enabled state (to cause re-entry into the manufacture programming mode). The secure command can be a management command that is signed with an encryption key, such as a private key. The system firmware 207 can decrypt the signed command using a corresponding encryption key, such as a public key or private key.

In some examples, the signed command can be presented to the computing system using a removable storage medium, such as a Universal Serial Bus (USB) storage medium or other type of storage medium. In some cases, it is desirable that power be removed from the embedded controller 202 before sending the signed command, which ensures that the embedded controller 202 validates the boot block 210 before the boot block 210 is executed and an interface (e.g. application programming interface or API) to the embedded controller 202 is enabled.

Once the signed command to re-enable the manufacture programming mode is accepted by the system firmware 207, and in response to the MPM parameter 250 and the EC_MPM parameter 252 both being set to the enabled state, the state machine transitions from state 408 to state 404. In the transition from state 408 to state 404, the embedded controller 202 can erase certain backup system data, including the machine unique data, GbE region data, and Descriptor region data, in the secondary non-volatile memory 216, and can set the following indicators to the false state: Valid MUD Captured, Valid GbE Captured, and Valid Descriptor Captured.

Another mechanism for re-entering the manufacture programming mode (other than sending the signed command discussed above) is to perform a physical rework of the circuit board on which the primary non-volatile memory 204 is mounted. In some examples, the primary non-volatile memory 204 can be physically removed from the circuit board and programmed offline to a default system firmware image, in which the MPM parameter 250 is set to the enabled state.

Once the re-programmed primary non-volatile 204 is placed back into the computing system 200, the system firmware 207 detects that the MPM parameter 250 has the enabled state, and the EC_MPM parameter 252 has the disabled state. This cases a transition from state 408 to state 410. When entry to the manufacture programming mode occurs due to reworking of the primary non-volatile memory 204, the system firmware 207 can check to ensure that the system firmware (including the boot block) has been validated for the current boot session. This can be based on checking an indicator associated with the system firmware 207. If the system firmware 207 has not been validated for the current boot session, then the system firmware 207 can send a command to force a check of the system firmware 207, and the computing system 200 can be restarted.

Upon transition from state 408 to state 410, the system firmware 207 can provide (at 412) a prompt for the service personnel to enter an input. If the input received is a special predefined key sequence, then the system firmware 207 then sends a command to the embedded controller 202 to set the EC_MPM parameter 252 to the enabled state. This causes both the MPM and EC_MPM parameters 250 and 252 to be set to the enabled state, which causes a transition to state 404.

In the transition from decision diamond 412 to state 404 due to input of the special predefined key sequence, the embedded controller 202 can clear the following system data that has been backed up to the secondary non-volatile memory 21, in some examples: machine unique data, GbE region data, and Descriptor region data.

However, if a special predefined key sequence was not received in response to the prompt presented at 412, the system firmware 207 sets the MPM parameter 250 to the disabled state, to cause a transition to state 408 from decision diamond 412. In this transition, the contents of the secondary non-volatile memory 216 remain unchanged and the system firmware 207 or EC firmware 208 can restore the machine unique data, GbE region data, and Descriptor region data from the secondary non-volatile memory 216 to the primary non-volatile memory 204, by replacing the respective system data in the primary non-volatile memory 204 with the corresponding system data in the secondary non-volatile memory 216 if there is any discrepancy with between the primary and secondary copies.

By using techniques or mechanisms according to some implementations, a manufacturing process of a computing system having primary and secondary non-volatile memories can be simplified by not having to program the secondary non-volatile memory before it is mounted on a circuit board for installation in the computing system. Also, various features can be deprecated individually in the event that data associated with the features become compromised. In addition, techniques or mechanisms are provided to allow entry of a manufacture programming mode to allow clearing or restoration of content of the secondary non-volatile memory.

Machine-readable instructions of various modules described above are loaded for execution on a processing circuit (e.g. embedded controller 102 or processor 106). A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of configuring a system, comprising:
in response to starting a system including a first non-volatile memory containing system boot code, and a second non-volatile memory, performing, by a controller, provisioning of the second non-volatile memory, the provisioning comprising:
checking that the second non-volatile memory is uninitialized,
in response to determining that the second non-volatile memory is uninitialized, copying the system boot code from the first non-volatile memory to the second non-volatile memory, and
creating a policy store in the second non-volatile memory, the policy store storing information relating to at least one policy relating to execution of the controller.

2. The method of claim 1, wherein the at least one policy relates to updating the system boot code upon detecting compromise of the system boot code, or to checking the system boot code for compromise.

3. The method of claim 1, wherein the provisioning further comprises initializing an audit data structure in the second non-volatile memory, the audit data structure to receive information relating to events of the controller.

4. The method of claim 1, wherein performing the provisioning is in response to detecting a first power up, at a factory where the system is manufactured, of a circuit board containing the controller and the second non-volatile memory.

5. The method of claim 1, further comprising:
during a programming process at a factory or at a service facility,
receiving, by the controller, a command from the system boot code; and
in response to the command, retrieve system data from the first non-volatile memory and copy the system data to the second non-volatile memory.

6. The method of claim 5, wherein the system includes plural types of system data, the method further comprising:
detecting compromise of one of the plural types of the system data; and
setting an indicator for the compromised type of the system data to indicate the detected compromise.

7. The method of claim 6, wherein the plural types of system data are selected from the group consisting of machine unique data that includes configuration data unique to the system, configuration data of a network controller, and data describing a layout of the first non-volatile memory.

8. The method of claim 1, wherein the checking comprises checking for a value stored in the second non-volatile memory and computed based on content in a specified region of the second non-volatile memory.

9. The method of claim 1, wherein the second non-volatile memory is accessible to the controller but is electrically isolated from a processor in the system, wherein the first non-volatile memory is accessible by both the controller and the processor.

10. A system comprising:
a processor;
a controller;
a first non-volatile memory storing a first indicator relating to a programming mode of the system;
a second non-volatile memory connected to the controller and storing a second indicator relating to the programming mode; and
system boot code executable on the processor to determine whether the system is to enter the programming mode based on values of the first and second indicators, wherein the system boot code is configurable while the system is in the programming mode.

11. The system of claim 10, wherein the second non-volatile memory is accessible to the controller but is electrically isolated from the processor, wherein the first non-volatile memory is accessible by both the controller and the processor, and wherein the system boot code is executable to further:
in response to determining that the system is to enter the programming mode, send a command to the controller to cause the controller to change the second indicator from a first value to a second value.

12. The system of claim 10, wherein different combinations of the values of the first and second indicators cause transitions to different states, wherein the transitions include a transition from a factory first boot state to a state corresponding to the programming mode.

13. The system of claim 12, wherein the transitions further include a transition from the state corresponding to the programming mode to another state to exit the programming mode.

14. The system of claim 10, wherein the first indicator is a first flag stored in the first non-volatile memory, and the second indicator is a second flag stored in the second non-volatile memory.

15. An article comprising at least one non-transitory machine-readable storage medium storing instructions that upon execution cause a system to:
in response to starting the system including a first non-volatile memory containing system boot code, and a second non-volatile memory, perform provisioning, by a controller of the system, of the second non-volatile memory, the provisioning comprising:
checking that the second non-volatile memory is uninitialized, the checking comprising checking for a value stored in the second non-volatile memory and computed based on content in a specified region of the second non-volatile memory; and
in response to determining that the second non-volatile memory is uninitialized, copy the system boot code from the first non-volatile memory to the second non-volatile memory, and copy system data relating to configuration of the system and configuration of at least one component of the system from the first non-volatile memory to the second non-volatile memory.

16. The article of claim 15, wherein the second non-volatile memory is accessible by the controller but inaccessible by a processor of the system, and wherein the first non-volatile memory is shared and accessible by the controller and the processor.

17. The article of claim 15, wherein the value is a hash computed based on the content in the specified region of the second non-volatile memory.

18. The article of claim 15, wherein the value is a checksum computed based on the content in the specified region of the second non-volatile memory.

19. The article of claim 15, wherein the second non-volatile memory is accessible to the controller but is electrically isolated from a processor in the system, wherein the first non-volatile memory is accessible by both the controller and the processor.

20. The article of claim 15, wherein the provisioning further comprises:
creating a policy store in the second non-volatile memory, the policy store storing information relating to a policy relating to execution of the controller.

* * * * *